(12) United States Patent
Ranganathan et al.

(10) Patent No.: US 11,536,026 B2
(45) Date of Patent: Dec. 27, 2022

(54) INTEGRAL WEATHER BARRIER PANELS

(71) Applicant: GCP Applied Technologies Inc.

(72) Inventors: Anandakumar Ranganathan, Lexington, MA (US); Robert A. Wiercinski, Lincoln, MA (US); Xia Cao, Acton, MA (US); Marysusan Couturier, Framingham, MA (US); Md Nasim Hyder, Somerville, MA (US); Jyoti Seth, Andover, MA (US); Nicholas Pankewytch, Framingham, MA (US)

( * ) Notice: Subject to any disclaimer, the term of this patent is extended or adjusted under 35 U.S.C. 154(b) by 0 days.

(21) Appl. No.: 16/316,924

(22) PCT Filed: Aug. 14, 2018

(86) PCT No.: PCT/US2018/046673
§ 371 (c)(1),
(2) Date: Jan. 10, 2019

(87) PCT Pub. No.: WO2019/036450
PCT Pub. Date: Feb. 21, 2019

(65) Prior Publication Data
US 2021/0340762 A1    Nov. 4, 2021

Related U.S. Application Data

(60) Provisional application No. 62/544,978, filed on Aug. 14, 2017.

(51) Int. Cl.
E04B 1/66    (2006.01)
B32B 7/08    (2019.01)
(Continued)

(52) U.S. Cl.
CPC ............. *E04C 2/246* (2013.01); *B32B 7/08* (2013.01); *B32B 21/02* (2013.01); *B32B 21/13* (2013.01);
(Continued)

(58) Field of Classification Search
CPC .......... E04C 2/246; B32B 7/08; B32B 21/02; B32B 21/13; B32B 21/14; B32B 2255/08;
(Continued)

(56) References Cited

U.S. PATENT DOCUMENTS 2,343,740 A    3/1944    Birmingham
2,954,302 A    9/1960    Gorman, Jr.
(Continued)

*Primary Examiner* — Phi D A
(74) *Attorney, Agent, or Firm* — Joseph D. Rossi; Nilay J Choksi

(57) ABSTRACT

The present invention provides a panel sheathing for making wall and roof structures in which the panels (e.g., wood boards, oriented strand boards, plywood, etc.) are pre-coated at a factory, before installation at the building/construction site, using a polymeric barrier coating having specific water permeability, self-sealing properties with respect to penetrated metal fasteners (e.g., nails) in accordance with ASTM D7349 (modified using 1.5-5.0 inches water depth in hydrostatic head testing over sample of coated panel in which a steel nail is driven to within ⅛ inches of being flush with the panel and conditioning the test specimen for 24 hours at 23° C. prior to hydrostatic loading), as well as anti-blocking properties whereby the coated panels can be transported in stacked configuration without sticking or disintegration of the polymeric barrier coating. The coated panels do not require the use at the installation site of felt paper, house wrap, or additional applied barrier coating to provide excellent weather barrier properties. The present invention also provides methods for constructing the panel sheathing structure as well as for making the coated panels.

17 Claims, 1 Drawing Sheet

(51) Int. Cl.
*E04B 1/62* (2006.01)
*B32B 21/02* (2006.01)
*E04C 2/24* (2006.01)
*B32B 21/13* (2006.01)
*B32B 21/14* (2006.01)
*C09D 4/00* (2006.01)
*C09D 5/00* (2006.01)
*C09D 153/00* (2006.01)
*C09D 175/02* (2006.01)

(52) U.S. Cl.
CPC ............... *B32B 21/14* (2013.01); *C09D 4/00* (2013.01); *C09D 5/00* (2013.01); *C09D 153/00* (2013.01); *C09D 175/02* (2013.01); *E04B 1/62* (2013.01); *E04B 1/66* (2013.01); *B32B 2255/08* (2013.01); *B32B 2255/26* (2013.01); *B32B 2607/00* (2013.01); *E04B 1/625* (2013.01); *E04B 2103/04* (2013.01)

(58) Field of Classification Search
CPC ... B32B 2255/26; B32B 2607/00; C09D 4/00; C09D 5/00; C09D 153/00; C09D 175/02; E04B 1/62; E04B 1/66; E04B 1/625; E04B 2103/04
See application file for complete search history.

(56) References Cited

U.S. PATENT DOCUMENTS

| | | | |
|---|---|---|---|
| 3,166,434 A | 1/1965 | Gauger, Jr. | |
| 3,468,086 A | 9/1969 | Warner | |
| 3,654,044 A | 4/1972 | Hirota | |
| 3,918,233 A | 11/1975 | Simpson | |
| 4,158,712 A | 6/1979 | Degens | |
| 4,404,252 A | 9/1983 | Hetzler et al. | |
| 4,707,961 A | 11/1987 | Hunley et al. | |
| 5,071,688 A | 10/1991 | Hoffman | |
| 5,231,814 A | 8/1993 | Hageman | |
| 5,509,715 A | 4/1996 | Scharpf | |
| 5,529,812 A | 6/1996 | Keding | |
| 5,955,203 A | 9/1999 | Briggs et al. | |
| 6,110,315 A | 8/2000 | Keding | |
| 6,136,408 A | 10/2000 | Radcliffe et al. | |
| 6,355,333 B1 | 3/2002 | Waggoner et al. | |
| 6,524,679 B2 | 2/2003 | Hauber et al. | |
| 6,737,155 B1 | 5/2004 | Ou | |
| 6,866,492 B2 | 3/2005 | Hauber et al. | |
| 6,868,643 B1 | 3/2005 | Williams | |
| 6,901,712 B2 | 7/2005 | Linel | |
| 6,949,160 B2 | 9/2005 | Weiss et al. | |
| 7,159,368 B2 | 1/2007 | Peng | |
| 7,658,040 B2 | 2/2010 | Bennett et al. | |
| 7,677,002 B2 | 3/2010 | Bennett et al. | |
| 7,721,506 B2 | 5/2010 | Bennett et al. | |
| 7,866,100 B2 | 1/2011 | Bennett et al. | |
| 7,870,694 B2 | 1/2011 | Bennett et al. | |
| 7,877,938 B2 | 2/2011 | Bennett et al. | |
| 7,972,707 B2 | 7/2011 | Padmanabhan | |
| 8,112,950 B2 | 2/2012 | Bennett et al. | |
| 8,277,915 B2 | 10/2012 | Couturier | |
| 8,337,994 B2 | 12/2012 | Padmanabhan | |
| 8,474,197 B2 | 7/2013 | Bennett et al. | |
| 8,568,544 B2 | 10/2013 | Engbrecht et al. | |
| 8,993,462 B2 | 3/2015 | Duselis et al. | |
| 9,010,044 B2 | 4/2015 | Bennett et al. | |
| 9,234,355 B2 | 1/2016 | Sealock et al. | |
| 9,562,359 B1 * | 2/2017 | Grisolia | E04F 13/04 |
| 9,689,159 B2 | 6/2017 | Bennett et al. | |
| 9,695,588 B2 | 7/2017 | Bennett et al. | |
| 2002/0058758 A1 | 5/2002 | Culbertson et al. | |
| 2004/0137813 A1 * | 7/2004 | Faucher | E04B 1/625 |
| | | | 442/76 |
| 2004/0211139 A1 | 10/2004 | Peng | |
| 2004/0226247 A1 | 11/2004 | Byrd | |
| 2005/0005567 A1 | 1/2005 | Meister et al. | |
| 2007/0130867 A1 | 6/2007 | Flaherty | |
| 2007/0178793 A1 | 8/2007 | Gerello | |
| 2008/0008885 A1 | 1/2008 | Terfloth et al. | |
| 2009/0087616 A1 | 4/2009 | Hennis et al. | |
| 2009/0223618 A1 | 9/2009 | Smith | |
| 2009/0274913 A1 | 11/2009 | Okushita et al. | |
| 2009/0297865 A1 | 12/2009 | Hauber et al. | |
| 2011/0045308 A1 | 2/2011 | Kiljunen et al. | |
| 2011/0185666 A1 | 8/2011 | Russell | |
| 2011/0236653 A1 | 9/2011 | Hayashi et al. | |
| 2012/0055110 A1 * | 3/2012 | Schroeer | E04B 1/66 |
| | | | 52/515 |
| 2014/0120301 A1 | 5/2014 | Jordan | |
| 2014/0238593 A1 * | 8/2014 | Morgeneyer | B32B 7/12 |
| | | | 524/505 |
| 2014/0272404 A1 | 9/2014 | Shake et al. | |
| 2015/0064433 A1 | 3/2015 | Foster et al. | |
| 2016/0039968 A1 | 2/2016 | Rukavina | |
| 2016/0222656 A1 | 8/2016 | Teng et al. | |
| 2017/0363134 A1 * | 12/2017 | Thomas | E04B 1/625 |
| 2017/0368785 A1 * | 12/2017 | Fox | B32B 3/08 |
| 2018/0237662 A1 * | 8/2018 | Widenbrant | C09J 7/26 |
| 2018/0363298 A1 * | 12/2018 | Giles | B29C 44/3403 |
| 2021/0162713 A1 * | 6/2021 | Couturier | B32B 27/28 |
| 2021/0254332 A1 * | 8/2021 | Lambach | B32B 27/32 |

* cited by examiner

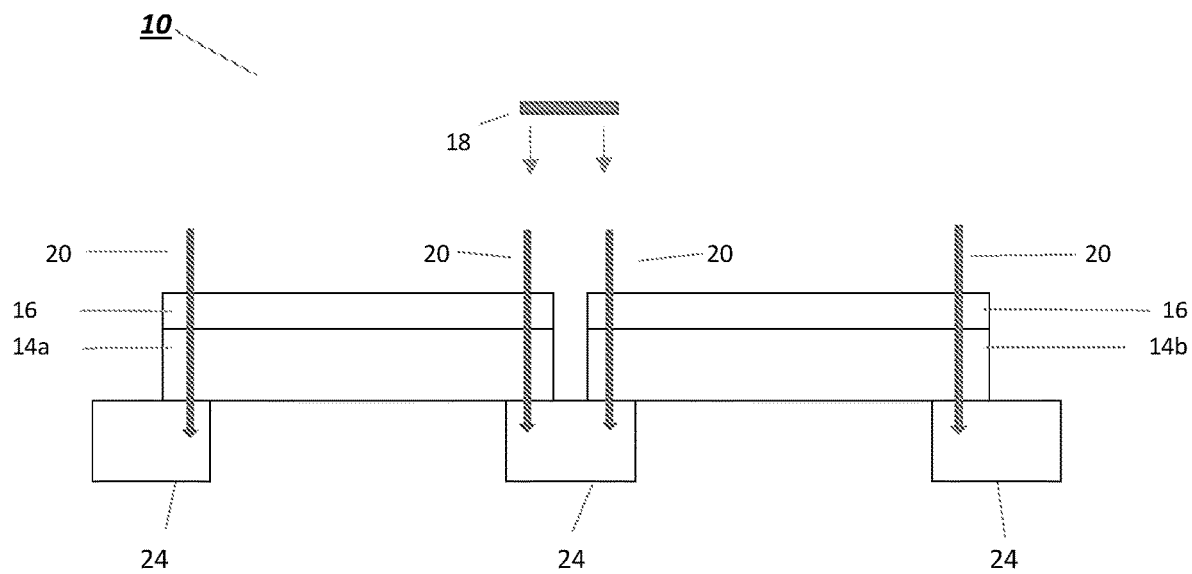

INTEGRAL WEATHER BARRIER PANELS

This is an application submitted under Section 371 of Title 35 U.S.C. and is based on PCT/US18/46673 filed Aug. 14, 2018, which is based on U.S. Application Ser. No. 62/544,978 filed Aug. 14, 2017.

FIELD OF THE INVENTION

The present invention relates to sheathing systems, and, more particularly, to panel-based sheathing systems for roofs and walls employing panels (boards) pre-coated with a polymer barrier coating having vapor-permeability, nail-sealability, and blocking resistance.

BACKGROUND OF THE INVENTION

The walls of buildings commonly include inner and outer sheathing materials attached to the studs of the frame structure and insulation within the cavities of the walls. The inner sheathing material is usually made of gypsum or plaster, while the outer sheathing material is usually made of wood, wood chips, synthetic board, gypsum, or masonry materials.

Cladding or siding materials typically cover outer wall surfaces, and are frequently intended for aesthetic appeal, but not often not designed sufficiently to resist wind-driven rain.

Many sheathing materials, such as wooden boards and oriented strand board (OSB), are not sufficiently designed for prolonged exposure to water or moisture or for severe weather conditions such as a high winds and highly-variable temperature swings that distort the material substrates. While wood- and OSB-based wall constructions typically allow for permeation of water vapor, helping to maintain dryness and to reduce mold and fungus growth that could lead to deterioration of the building and health risks, such materials have shortcomings.

One shortcoming is air leakage through joints, nail holes, and other penetrations. Excess air leakage through walls can adversely affect the comfort of occupants, as well as result in significant reduction of energy efficiency in terms of heating or cooling the building structure. A proper wall design must fulfill certain requirements to resolve leakage issues. In other words, the wall design should (1) prevent liquid water from reaching inner portions of the wall; (2) allow water vapor to escape from the wall cavities; and (3) prevent excessive air movement through the wall structure, whether into or out of the building structure.

Over the years, manufacturers have introduced barrier products to address these issues. A standard developed by International Code Council (ICC), "AC 38 Acceptance Criteria for Water Resistive Barriers," covers the performance criteria required for such products. Construction codes often require deployment of weather barriers in both residential homes and commercial buildings. The industry often refers to such products as "weather barriers" or "air barriers."

The earliest weather barriers include tarpaper (asphalt-impregnated) which an applicator mechanically attaches to the building structure under clapboard or other cladding layers. The paper could be vapor permeable and effective for directing water away from the building interior.

Later weather barriers include synthetic nonwoven/woven "house wrap" membranes. A popular house wrapping material is commercialized by Du Pont under the brand name TYVEK®, and this made of spun-bonded non-woven material. A number of other sheet-like products intended to act as a barrier to liquid water but to allow vapor to escape are available. The vapor permeability aspect of such barrier products is referred to as "breathability." Contractors usually apply these breathable barrier products by nailing or stapling them to building studs. Self-adhered weather barriers are of the "peel and stick" variety. Similar to the synthetic weather barriers, these consist of pressure-sensitive adhesives that eliminate the need for mechanical attachment and taping of seams. Available barrier products include PERM-A-BARRIER® VPS and VYCOR® ENV-S® products of GCP Applied Technologies (Cambridge, Mass., USA) and BLUESKIN® products of Henry Company.

Liquid-applied products can be water-based coatings, such as available from GCP Applied Technologies under the brand name PERM-A-BARRIER® VPL, or non-water-based, such as available also from GCP under the brand name Perm-A-Barrier® VPL 50, or from Du Pont under the TYVEK® WB brand. These products are sprayed- or roll-applied onto the building surface; and, like self-adhered barriers, can provide superior performance in terms of air barrier properties, as compared to nailed or stapled barriers.

Another approach is to combine a weather barrier layer to sheathing as an integral component. ZIP™ board products available from Huber Engineered Woods and FORCE-FIELD® weather-resistive barrier and DenseElement™ Barrier System from Georgia-Pacific are commercial examples of these type of products. These weather barriers include a paper layer that is adhered to wood or gypsum board during the manufacturing process, thereby eliminating the step of applying the weather barrier layer at the building site. While these barriers usually meet water vapor breathability requirements if properly installed, the present inventors believe that coated paper sheet does not seal nail holes or other fastener perforations. Nails used for attaching boards or tile as well as other fastener types (e.g., metal staples, tacks, screws) used for attaching cladding will usually penetrate or even tear the paper sheeting, thereby allowing air and water into the structure and potentially leading to mold growth.

The above prior art barrier products have disadvantages in terms of barrier protection; and thus a novel weather barrier sheathing system is needed.

SUMMARY OF THE INVENTION

In surmounting the disadvantages of prior art panel (e.g., board) sheathing systems, the present invention provides a panel sheathing system for constructing wall and roof structures wherein the panels are pre-coated at a location (e.g., factory or other production line) that is different or separate from the installation/construction site, using a polymeric barrier coating having specific water permeability, self-sealing properties with respect to penetrated metal fasteners (e.g., nails) in accordance with ASTM D7349, and anti-blocking properties that allow stacking of the panels, such that felt paper, house wrapping, or a separate air barrier coating layer are not required for providing an excellent barrier to air, wind, and wind-driven rain, and other environmental effects. The coated panels do not require an additional step of applying additional sheeting or coating materials to provide air- and water-barrier properties.

An exemplary panel sheathing system of the present invention comprises: at least two adjacent coated panels, each coated panel having an outer surface and an inner surface connected by transverse edges, and at least one transverse edge extending between the at least two adjacent coated panels, whereby at least the outer surface of the at least two adjacent coated panels contains a polymeric barrier coating, each of the adjacent coated panels being aligned at the building site with at least one transverse edge proximate to the at least one transverse edge of the adjacent coated panel and defining a joint between these at least two adjacent coated panels; the at least two adjacent coated panels being pre-coated prior to being aligned at the building site, using a panel coating production line located at a site that is separate from the building site at which the adjacent coated panels are aligned, the at least two adjacent coated panels being coated with a polymeric barrier coating having the following properties: (A) the polymeric coating barrier having an average dried thickness in the range of 1 to 20 mils; (B) the polymeric coating barrier having water vapor permeability of at least 5 perms, and preferably 10 perms as measured in accordance with ASTM E 96, Method B (2016); (C) the polymeric coating barrier being self-sealing around metal fasteners penetrated through the coated panels to prevent passage of liquid water at the coating/fastener interface (according to ASTM D7349/D7349M-11, Protocol 1, modified by driving fastener head to within ⅛ inch short of being flush with coating sample, and using (at least a) 1.5 inch water depth of hydrostatic head test (and more preferably a 5 inch water depth of hydrostatic head test); and (D) the polymeric coating barrier having blocking resistance, wherein, if the at least two of the boards were stacked on top of each other such that at least one coated outer surface were sandwiched between the two panels, such stacked panels would not become blocked when subjected to a pressure of 60 pounds per square inch, under static load for 24 hours at temperature within the range of 60° F.-72° F. (and, more preferably, within 50° F.-90° F.; and, most preferably, within the range of 40° F.-120° F.).

An exemplary method of the present invention comprises: providing a plurality of coated panels and aligning pairs of the coated panels, according to the exemplary panel system described above, along adjacent edges to define a joint between adjacent coated panels; fastening the aligned coated panels against a wall or roofing structure (e.g., against studs, or other building structure) using a metal fastener chosen from nails, staples, screws, or mixture thereof penetrating through the panel coatings to secure the panels into place to form sheathing on the wall or roof structure; and seaming the joints defined between adjacent coated panels using a tape, a liquid-applied coating, or combination thereof.

An exemplary method for making sheathing material for wall or roof structures, comprising: providing panels made of material chosen from wood, wood chips, wood wafers, wood particles in laminate or non-laminate form, plywood, oriented strand board, gypsum, or cement; and coating the panels with a polymeric barrier coating having the following properties: (A) the polymeric coating barrier having an average dried thickness in the range of 1 to 20 mils; (B) the polymeric coating barrier having water vapor permeability of at least 5 perms (and more preferably at least 10 perms) as measured in accordance with ASTM E 96-16 Method B; (C) the polymeric coating barrier being self-sealing around metal fasteners penetrated through the coated panels to prevent passage of liquid water at the coating/fastener interface (according to ASTM D7349/D7349M-11, Protocol 1, modified by driving fastener head to within ⅛ inch short of being flush with coating sample, conditioning the test specimen for 24 hours at 23° C.), and using at least 1.5 inch water depth in hydrostatic head test (and more preferably at least 5 inches of water depth in hydrostatic head test); and (D) the polymeric coating barrier having blocking resistance, wherein, if the at least two of the boards were stacked on top of each other such that at least one coated outer surface were sandwiched between the two panels, such stacked panels would not become blocked when subjected to a pressure of 60 pounds per square inch, under static load for 24 hours at temperature within the range of 60° F. to 72° F. (and, more preferably, within 50° F.-90° F.; and, most preferably, within the range of 40° F.-120° F.).

Further advantages and features of the present invention are described hereinafter.

BRIEF DESCRIPTION OF DRAWINGS

Further advantages and features of the present invention may be more readily appreciated or discerned when the following detailed description of exemplary embodiments is considered in conjunction with the appended drawing wherein:

FIG. 1 is a schematic illustrative diagram of an exemplary weather barrier panel assembly or system comprising at least two adjacent panels pre-coated with a polymeric barrier coating in accordance with the present invention.

DETAILED DESCRIPTION OF EXEMPLARY EMBODIMENTS

As illustrated in FIG. 1, an exemplary panel-based sheathing system or assembly 10 according to the present invention is made by mechanically attaching, to a mounting substrate 24 such as a wall or roofing structure (e.g., wood or metal stud or rafter)(a stud is a structural wall element whereas a rafter is a structural roofing element) at least two coated panels (designated as at 14A and 14B) each of which is coated on at least an outer face or surface with a polymeric weather barrier coating (the outer coated surfaces both being designated as at 16). The adjacent coated panels or boards 14A/14B are aligned together along a common edge, against the mounting substrate 24, and fastened using a fastener 20 (e.g., nails or screws which may be galvanized or not), such that the fastener 20 penetrates the coating 16 and panels 14A/14B to affix the panels to the mounting substrate 24. A tape and/or liquid sealant (designated at 18) is used for bridging the gap or opening between the aligned edges of the adjacent coated panels 14A and 14B to complete the weather barrier sheathing on the building substrate 24. (The gap distance between panels 14A and 14B is exaggerated in FIG. 1 for purposes of illustration).

The polymeric coating 16 is intended to act as an effective weather barrier layer. It has several characteristics, including water vapor permeability, fastener-sealability properties, and blocking resistance, all of which can be measured using relatively convenient or standard test methodologies. For typical building applications, the barrier coating 16 should have a thickness in the range of 1 to 20 mils; more preferably, in the range of 3 to 15 mils; and, most preferably, in the range of 5 to 10 mils. Desired thickness of the coating layer 16 may be selected based on application and manufacturing considerations.

Exemplary barrier coatings 16 of the invention should block liquid water (such as sprayed at conventional garden hose pressures) but also have a water vapor permeability in accordance with ASTM E 96 method B (2016). At the target coating thicknesses, the water vapor transmission of the coating should exceed or equal 5 perms. More preferably, the water vapor transmission at the targeted thickness should exceed or equal 10 perms.

Exemplary barrier coatings 16 of the invention should also have self-sealing ability around metal fasteners (e.g., steel nails) used for mechanically attaching panels to studs, frames, or other building structure. For example, the present inventors contemplate that when coated onto panels (such as wood, wood chipboard or laminates such as plywood, oriented strand board, gypsum board, etc.), the polymer coating 16 should meet sealability properties in accordance with one or more of ASTM D7349/D7349M-11 (e.g., Protocol 1 modified) and ASTM E331-00.

Finally, the coated panels 16/14 of the invention should have blocking resistance, which means that the panels can be coated at a factory or production line that is separate from (on a different real state location) from the job site, such that the coated panels can be shipped in stacked form, so that pressure from the weight of the panels (boards) does not cause the coating applied to one panel to stick to another panel causing difficulty in removing panels from a stack or causing rupture of the coating when stacked panels are pried apart at the installation site. The anti-blocking property may be described in terms of resisting sticking/rupture when subjected to pressure that is equivalent to 60 pounds per square inch under static load for 24 hours at temperature within specified ranges (e.g., 60° F. to 72° F.).

We may now turn our attention to various aspects of the present invention as follows.

In a first aspect, the invention provides a panel-based sheathing system for sheathing a wall or roof structure at a building site, the sheathing system comprising: at least two adjacent coated panels of the sheathing system, each coated panel having an outer surface and an inner surface connected by four transverse edges, and at least one transverse edge extending between the at least two adjacent coated panels, whereby at least the outer surface of the at least two adjacent coated panels contains a polymeric barrier coating, each of the adjacent coated panels being aligned at the building site with at least one transverse edge proximate to the at least one transverse edge of the adjacent coated panel and defining a joint between these at least two adjacent coated panels; the at least two adjacent coated panels being pre-coated prior to being aligned at the building site, using a panel coating production line located at a site that is separate from the building site at which the adjacent coated panels are aligned, the at least two adjacent coated panels being coated with a polymeric barrier coating having the following properties: (A) the polymeric coating barrier having an average dried thickness in the range of 1 to 20 mils, more preferably 3-15 mils, and most preferably 5-10 mils; (B) the polymeric coating barrier having water vapor permeability of at least 5 perms, and more preferably of at least 10 perms, as measured in accordance with ASTM E 96, Method B-16; (C) the polymeric coating barrier being self-sealing around metal fasteners penetrated through the coated panels to prevent passage of liquid water at the coating/fastener interface (according to ASTM D7349/D7349M-11, Protocol 1, modified by driving fastener head to within ⅛ inch short of being flush with coating sample, conditioning the test specimen for 24 hours at 23° C., and using 1.5 inch water depth, and preferably 5 inch water depth, of hydrostatic head test); and (D) the polymeric coating barrier having blocking resistance, wherein, if the at least two of the boards were stacked on top of each other such that at least one coated outer surface were sandwiched between the two panels, such stacked panels would not become blocked when subjected to a pressure of 60 pounds per square inch, under static load for 24 hours at temperature within the range of 60° F. to 72° F. (and, more preferably, within the range of 50° F. to 90° F., and most preferably within the range of 40° F. to 120° F.).

In a second aspect, based on the first exemplary aspect described above, the present invention provides a panel sheathing system wherein the panel system forms a sealed wall or roof of the structure without applying a paper layer or house wrap layer over or against the coated panels, or without applying a further air barrier coating or pressure sensitive adhesive coating layer over the panel sheathing system.

In a third aspect, based on any of the first through second exemplary aspects described above, the present invention provides a panel sheathing system wherein the panel comprises a material chosen from wood, wood chips, wood wafers, wood particles in laminate or non-laminate form, plywood, oriented strand board, gypsum, or cement.

In a fourth aspect, based on any of the first through third exemplary aspects described above, the present invention provides a panel sheathing system wherein the panel comprises wood, plywood, oriented strand board, or a combination thereof.

In a fifth aspect, based on any of the first through fourth exemplary aspects described above, the present invention provides a panel sheathing system wherein the polymeric coating comprises at least one polymer chosen from a polyurethane thermoplastic elastomer block copolymer, polyurea, hot melt polyamide, an ABA block copolymer comprising polymethylmethacrylate/polybutyl acrylate/polymethylmethacrylate, a blend of hot melt polyamide with the ABA block copolymer, and a UV cured acrylic.

In a sixth aspect, based on any of the first through fifth exemplary aspects described above, the present invention provides a panel sheathing system wherein the at least one polymer is a polyurethane thermoplastic elastomer block copolymer. For example, an exemplary copolymer comprises hard and soft segments where the soft segment is the reaction product of a diisocyanate and a (polyol) longchain diol and the hard segment is a reaction product of the diisocyanate and a short-chain diol.

Either aromatic or aliphatic diisocyanates may be used. Aliphatic diisocyanates are preferred if long-term weatherability is required. Aromatic isocyanates include methylene diphenyl diisocyanate (MDI), and toluene diisocyanate (TDI). Aliphatic diisocyanates include 4,4'-methylene dicyclohexyl diisocyanate (H12 MDI), isophorone diisocyanate (IPDI), and hexamethylene diisocyanate (HDI). The most commonly used short-chain diols include butanediol, hexanediol, or aromatic diols. The longchain polyether diol may be selected from a list including polypropylene glycol, polytetramethylene glycol, polyethylene glycol, polyethylene glycol/polypropylene glycol copolymers, polytetrahydrofuran, a mixture of these, or copolymers of these. The long chain soft segments are the breathable i.e. water vapor-permeable segments. Molecular weights generally range between 1000 and 4000. Blends of different soft segments are used to balance physical properties. PEO is more hydrophilic, while PTHF is mechanically tougher and does not swell as much. Increasing the CH2/O ratio in the soft segment decreases the compatibility between hard and soft segments.

In a seventh aspect, based on any of the first through sixth exemplary aspects described above, the present invention provides a panel sheathing system wherein the at least one polymer is a polyurea that is the reaction product of an isocyanate terminated prepolymer and a multifunctional amine.

The isocyanate terminated prepolymer is a reaction product of the multifunctional isocyanate and one or more multifunctional polyols. Either aromatic or aliphatic diisocyanates may be used. Aliphatic diisocyanates are preferred if long-term weatherability is required. Aromatic isocyanates include methylene diphenyl diisocyanate (MDI0, and toluene diisocyanate (TDI). Aliphatic diisocyanates include 4,4'-methylene dicyclohexyl diisocyanate (H12 MDI), isophorone diisocyanate (IPDI), and hexamethylene diisocyanate (HDI). The isocyanate may be monomeric. These have a functionality of 2. Alternatively the isocyanate may be polymeric where the functionality is greater than 2 and generally ranges from 2.2 to 3.2.

To ensure satisfactory water vapor permeability polyether polyols are utilized to produce the isocyanate terminated prepolymer. These polyols include polyethylene glycol, polypropylene glycol, copolymers of polyethylene glycol and polypropylene glycol, and polytetramethylene glycol. To achieve high permeability polyols comprising propylene glycol tipped with ethylene glycol are preferred.

Generally, more than two equivalents of isocyanate functional group, N=C=O per one equivalent of hydroxyl, OH, are utilized to produce an isocyanate terminated prepolymer.

The multifunctional amine may be an amino functional polyether, an amine chain extender, or a combination of the two. Amino functional polyethers are sold by Huntsman under the trade name JEFFAMINE™. The polyether component may be polyethylene glycol, polypropylene glycol, or a copolymer of polyethylene glycol and polypropylene glycol.

Multifunctional amine chain extenders may be used to increase tensile strength and hardness. Secondary and or hindered amine chain extenders may also be used to decrease reaction rate and enhance pot life. Secondary amine chain extenders include aspartic esters like Jeffamine 1420 and 1520, 1,3,3-Trimethyl-N-(1-methylethyl)-5-[(1methylethyl)amino] cyclohexanemethanamine (Jefflink 754), 4,4'-Bis(sec-butylamino)dicyclohexylmethane (Clearlink 1000), N,N'-Bis(3,3-dimethyl-2-butyl)-1,6-diaminohexane (Ethacure 90), and 4,4'-Bis(sec-butylamino)diphenylmethane (ethacure 420). Hindered primary aromatic amine chain extenders include 3,5-Diethyl-(2,4- or 2,6-)toluenediamine (Ethacure 100) and 3,5-Dimethylthio-2,4-(or 2,6-)toluenediamine (Ethacure 300). These also provide for reduced reaction rate in comparison to primary aliphatic amines.

In an eighth aspect, based on any of the first through seventh exemplary aspects described above, the present invention provides a panel sheathing system wherein the at least one polymer is a hot melt polyamide coating. This coating may be produced by the reaction of a dicarboxylic acid and a diamine. The dicarboxylic acid may be selected from a list including dimerized fatty acids, dodecanedioic acid, sebacic acid, azelaic acid, and adipic acid. Dimerized fatty acids are preferred. Amines may be selected from a list including ethylene diamine, hexamthlene diamine, diethylene triamine, triethylene tetramine, piperazine, dipiperidyl propane, polyoxypropylene diamine. The hot melt polyamide coating may comprise a tackifying resin. Tackifying resins may be selected from a list including rosin, dimerized rosin, rosin esters, rosin phenolics, ketone resins, modified phenolic resins, and maleic resins. The hot melt polyamide coating may also comprise a plasticizer. Plasticizers may be selected from a list including paratoluene sulfonamide, N-Ethyl paratoluene sulfonamide, N-cyclohexyl paratoluene sulfonamide, triphenyl phosphate, tributyl phosphate, phthalate esters, and castor oil.

In a ninth aspect, based on any of the first through eighth exemplary aspects described above, the present invention provides a panel sheathing system wherein the at least one polymer is an ABA acrylic tri-block copolymer comprising polymethylmethacrylate, polybutylacrylate, polymethyl methacrylate. To achieve an appropriate balance between water vapor permeability and blocking resistance an appropriate ratio of polymethylmethacrylate to polybutyl acrylate must be utilized. Preferably, the maximum percentage of polymethylmethacrylate in the tri-block copolymer is 35%.

In a tenth aspect, based on any of the first through ninth exemplary aspects described above, the present invention provides a panel sheathing system wherein the at least one polymer comprises blends of the ABA acrylic block copolymer and a hot melt coating that is the reaction product of difunctional carboxylic acid and a difunctional amine. For example, the copolymer can be a blend of a polymethylmethacrylate/polybutyl acrylate/polymethylmethacrylate ABA triblock copolymer and a hot melt polyamide coating (see above). Preferably, the ratio of ABA block copolymer to hot melt polyamide coating is 4:1 to 1:4.

In an eleventh aspect, based on any of the first through tenth exemplary aspects described above, the invention provides a panel sheathing system wherein the at least one polymer is a coating produced by ultraviolet cure. For example, this could include a mixture of acrylated monomers, acrylated oligomers, or a mixture thereof. As another example, the coating may comprise a mixture of components chosen from mono-functional acrylated monomer(s), polyfunctional acrylated monomer(s), and acrylated oligomer (s). Alternatively, the UV-cured coating may comprise a mixture of components chosen from monofunctional acrylated monomer(s) and polyfunctional acrylated monomer(s).

A preferred acrylated oligomer is a urethane acrylate. The first step is the production of an isocyanate terminated prepolymer synthesized by reaction of a polyol with a polyfunctional isocyanate.

A preferred polyol is a polyether polyol. The polyether may be chosen from polyethylene glycol, polypropylene glycol, tetramethylene glycol, and copolymer of ethylene glycol and propylene glycol.

Either aromatic or aliphatic diisocyanates may be used. Aliphatic diisocyanates are preferred if long-term weatherability is required. Aromatic isocyanates include methylene diphenyl diisocyanate (MDI0, and toluene diisocyanate (TDI). Aliphatic diisocyanates include 4,4'-methylene dicyclohexyl diisocyanate (H12 MDI), isophorone diisocyanate (IPDI), and hexamethylene diisocyanate (HDI).

The isocyanate terminated prepolymer is reacted with a hydroxy functional acrylate or a hydroxy functional methacrylate to produce an (meth)acrylate functional oligomer. The functionality of the acrylated oligomer may range from 2 to 6.

Acrylate and methacrylate monomers generally have 1 to 4 acrylate or methacrylate groups per molecule. They range in molecular weight from 100 to 800. Viscosity generally ranges from 5 to 200 centapoise at 25° C. Volatility ranges from low to moderate. In order to achieve satisfactory water vapor permeability, use of polar acrylated monomers is preferred. Many of these comprise ethylene oxide and or propylene oxide segments. These may be monofunctional, difunctional, or trifunctional acrylates. The inventors contemplate that suitable monomers may also be chosen from diethylene glycol methyl ether methacrylate, caprolactone acrylate, ethoxylated (4) nonyl phenol acrylate, alkoxylated phenol acrylate, 2(2-ethoxyethoxy) ethyl acrylate, ethylene oxide-propylene oxide copolymer hydroxypropyl methacrylate ether, alkoxylated tetrahydrofurfuryl acrylate, polyethylene glycol methyl ether methacrylate, alkoxylated phenol acrylate, polypropyleneglycol methacrylate, polyethylene glycol methacrylate, polyethylene glycol acrylate, polyethylene glycol-tetramethylene glycol methacrylate, polypropylene glycol dimethacrylate, polyethylene glycol diacrylate, polypropylene glycol acrylate, 2-phenoxyethyl acrylate, 2-phenoxyethyl methacrylate, propoxylated glyceryl triacrylate, alkoxylated lauryl acrylate, ethoxylated trimethylolpropane triacrylate, propoxylated neopentyl glycol diacrylate, alkoxylated tetrahydrofurfuryl acrylate, polyethylene glycol diacrylate, alkoxylated hexanediol diacrylate, propoxylated trimethylolpropane triacrylate, tripropylene glycol diacrylate, alkoxylated hexanediol diacrylate, ethoxylated trimethylolpropane triacrylate, and mixtures thereof.

Other polar monomers include hydroxy acrylates and hydroxy methacrylate's. Examples of the hydroxyalkyl (meth)acrylate include 2-hydroxyethyl methacrylate, 2-hydroxypropyl methacrylate, 2-hydroxyethyl acrylate, 2-hydroxypropyl acrylate, 4-hydroxybutyl acrylate, and 4-hydroxybutyl methacrylate.

Mixtures of polar monomers with less polar monomers may also be utilized. Less polar monomers include 3,3,5 trimethylcyclohexyl methacrylate, C12 to C14 alkyl methacrylate, cyclic trimethylolpropane formal acrylate, dicyclopentadienyl methacrylate, isobornyl acrylate, isobornyl methacrylate, isodecyl acrylate, isodecyl methacrylate, isooctyl acrylate, lauryl acrylate, lauryl methacrylate, octyldecyl acrylate, stearyl acrylate, stearyl methacrylate, tetrahydrofurfuryl acrylate, tetrahydrofurfuryl methacrylate, tridecyl acrylate, and tridecyl methacrylate.

Another key ingredient in the exemplary UV-cured acrylate polymer coatings is a photoinitiator. Concentration of the photoinitiator may range from 0.5% to 15% based on total weight of the polymer formulation. There are two general types of photoinitiators. One type of photoinitiator undergoes cleavage upon UV irradiation to generate free radicals. Usually only one of these free radicals is reactive and initiates polymerization. Benzoin and benzoin ethers are included in this category. Another option is 1 hydroxy-cyclohexylphenyl-ketone. A second type of photoinitiator forms an excited state upon irradiation and abstracts an electron from a donor molecule. The donor molecule then initiates polymerization. Benzophenone is commonly used for this purpose.

Tertiary amines are commonly used with benzophenone as a synergist. These include dimethyl-p-toluidine, diisopropoxy-p-toluidine, N-Ethyl-N-(2-hydroxyethyl)-m-toluidine, N,N-bis-(2-hydroxyethyl)-p-toluidine, 4-dimethylaminobenzoic acid and the like, amine acrylates, trialkylamines, and others.

Acrylated amine co-initiators components may be used as well. The acrylated amine coinitiators react similarly to other acrylate monomers and oligomers. As such, they can become an integral part of the cured polymer.

In exemplary embodiments such as those described in any of the fifth through eleventh exemplary embodiments above, the polymeric barrier coating (designated as 16 in FIG. 1) may further include organic hydrophilic materials, such as superabsorbent polymers and water-soluble polymers like polyvinyl alcohol, polyethylene oxide, and the like. Inorganic hydrophilic options include materials with hydrophilicity or porosity, such as a nano clay or aerogel.

In an twelfth aspect, based on any of the first through eleventh exemplary aspects described above, the invention provides a panel sheathing system further comprising fasteners chosen from nails, staples, screws, or mixture thereof, the fasteners being penetrated through the panel coatings to secure the panels into place to form sheathing for the wall or roof structure.

In a thirteen aspect, based on any of the first through twelfth exemplary aspects described above, the invention provides a panel sheathing system wherein the joint defined between the at least two coated panels are seamed using a tape, a liquid-applied coating, or combination thereof.

In a fourteenth aspect, based on any of the first through thirteenth exemplary aspects described above, the invention provides a panel sheathing system wherein the inner surface, transverse edges, or both the inner surface and transverse edges, are also coated with the polymeric barrier coating. While it may not be necessary, in most cases, to coat the inner surface and edges of the panels (14A, 14B), because the outer face of the panels will be coated and seamed together at the joint (gap) between adjacent panels to complete the protective sheathing structure, it may be desirable to coat certain types of panels (wood boards) on both sides as well as along all transverse edges to minimize warping of the panel in areas of high humidity.

In a fifteenth aspect, based on any of the first through fourteenth exemplary aspects described above, the invention provides a panel sheathing system wherein the polymeric barrier coating comprises a filler in the amount of 0% to 10% based on total weight of the coating (and more preferably 0% to 5%, and most preferably 0% to 3%, based on the total weight of the polymeric barrier coating 16). Typical fillers used in polymeric coatings includes calcium carbonate, silica, sand, and other inorganic materials. In most preferred exemplary embodiments, however, the polymeric barrier coating should have little, if any, such filler particles, because the presence of filler particles tends to defeat the ability of the coating to act as a water and moisture barrier.

In a sixteenth aspect, the present invention provides an exemplary method for making a panel-sheathing system, comprising: providing a plurality of coated panels (e.g., 16/14) and aligning pairs of the coated panels, according to any of the first through fifteenth aspects as described above, along adjacent edges to define a joint between adjacent coated panels; fastening (e.g., as designated by arrows at 20 in FIG. 1) the aligned coated panels against a wall or roofing structure (designated as at 24 in FIG. 4) using a metal fastener (20) chosen from nails, staples, screws, or mixture thereof penetrating through the panel coatings (16) to secure the panels (14) into place to form sheathing on a wall or roof structure; and seaming the joints defined between adjacent coated panels (16/14A, 16/14B) using a tape, a liquid-applied coating, or combination thereof (as designated at 18 in FIG. 1).

In a seventeenth aspect, the present invention provides an exemplary method for making a panel-sheathing system comprising: providing at least two adjacent coated panels (16/14) of the sheathing system, each coated panel (16/14) having an outer surface and an inner surface connected by four transverse edges, and at least one transverse edge extending between the at least two adjacent coated panels, whereby at least the outer surface of the at least two adjacent coated panels contains a polymeric barrier coating (16); aligning the adjacent coated panels (16/14A; 16/14B) at a building site with at least one transverse edge of one coated panel (e.g., 16/14A) proximate to the at least one transverse edge of an adjacent coated panel (16/14B) thereby to define a joint between the adjacent coated panels, the at least two adjacent coated panels being pre-coated (16) prior to being aligned at the building site using a panel coating production line located at a site that is separate from the building site at which the adjacent coated panels are aligned; the at least two adjacent coated panels being coated with a polymeric barrier coating (16) having the following properties: (A) the polymeric coating barrier having an average dried thickness in the range of 1 to 20 mils, more preferably 3-15 mils, and most preferably 5-10 mils; (B) the polymeric coating barrier having water vapor permeability of at least 5 perms, and more preferably of at least 10 perms, as measured in accordance with ASTM E 96, Method B-16; (C) the polymeric coating barrier being self-sealing around metal fasteners penetrated through the coated panels to prevent passage of liquid water at the coating/fastener interface (according to ASTM D7349/D7349M-11, Protocol 1, modified by driving fastener head to within ⅛ inch short of being flush with coating sample, conditioning the test specimen for 24 hours at 23° C., and using 1.5 inch water depth, preferably 5 inch water depth, of hydrostatic head); and (D) the polymeric coating barrier having blocking resistance, wherein, if the at least two of the boards were stacked on top of each other such that at least one coated outer surface were sandwiched between the two panels, such stacked panels would not become blocked when subjected to a pressure of 60 pounds per square inch, under static load for 24 hours at temperature within the range of 60° F. to 72° F. (and, more preferably, within the range of 50° F. to 80° F., and most preferably within the range of 40° F. to 100° F.).

In an eighteenth aspect, the present invention provides an exemplary method for making sheathing material for wall or roof structures, comprising: providing panels (14A, 14B) made of material chosen from wood, wood chips, wood wafers, wood particles in laminate or non-laminate form, plywood, oriented strand board, gypsum, or cement; and coating the panels with a polymeric barrier coating (designated at 16 in FIG. 1) having the following properties: (A) the polymeric coating barrier having an average dried thickness in the range of 1 to 20 mils, more preferably 3-15 mils, and most preferably 5-10 mils; (B) the polymeric coating barrier having water vapor permeability of at least 5 perms, and more preferably of at least 10 perms, as measured in accordance with ASTM E 96, Method B-16; (C) the polymeric coating barrier being self-sealing around metal fasteners penetrated through the coated panels to prevent passage of liquid water at the coating/fastener interface, in accordance with ASTM D7349/D7349M-11 (See e.g., Protocol 3); and (D) the polymeric coating barrier having blocking resistance, wherein, if the at least two of the boards were stacked on top of each other such that at least one coated outer surface were sandwiched between the two panels, such stacked panels would not become blocked when subjected to a pressure of 60 pounds per square inch, under static load for 24 hours at temperature within the range of 60° F. to 72° F. (and, more preferably, within the range of 50° F. to 90° F., and most preferably within the range of 40° F. to 120° F.).

Various exemplary methods for coating the panels (boards) are contemplated within this invention. The objective of coating process is to use a process that does not involve drying-off of water or solvent, that can be run sufficiently fast to be economical, and that provides, after coating, boards that can be stacked immediately for storage. For hot melt coating processes, thermoplastics are used which can be melted to become viscous fluid at elevated temperature and can solidify when cooled. Such thermoplastics may be coated using a hot-melt pump, an extruder equipped with a slot die or knife over roll coater to provide a uniform coating with controlled thickness at a high speed. Thermoplastic polyurethanes, acrylic copolymers and polyamides can be processed in this manner. For spray or roller coating methods, reactive polymers, such as, for example, two-component (e.g., polyureas) may be applied by this technique. The liquid starting polymers react and crosslink to reach solid state. For UV-triggered systems, low molecular weight polymers are available in fluid form but readily crosslink when applied as thin coating layers and exposed to UV light of suitable wavelength and intensity to form a solid film. Generally, these UV-triggered coatings are based on acrylic polymers.

As discussed at the outset of this section, the present inventors believe that standard tests may be used to determine self-fastener-sealability properties, requiring little modification. Of these, ASTM D 7349-11/D7349M-11 is perhaps the most convenient to use in terms of testing, under defined conditions, the capability of a waterproofing material to seal around a fastener that penetrates the material and prevents transmission of liquid water through the material at the penetration. In general, this standard test method is for a waterproofing material applied to a substrate. A fastener is driven through the waterproofed substrate such that the nail penetrates the uncoated backside of the substrate. The test assembly is conditioned. A hydrostatic load (level) of either 1.5 inches of water or 5 inches (most severe) of water is used. The test is considered to be passed if water does not leak through to the uncoated side of the substrate. The pathway for the leak is between the shaft of the nail and the substrate. Furthermore, there must be no water at the interface of the waterproofing material and the substrate. This is determined by removing waterproofing material from the substrate around the fastener penetration (e.g., nail shaft) after being subjected to water load. Details for the 1.5 inch in the 5 inch test are outlined below. These details are the same as for protocol 1 of ASTM D 7349-11 with the exception that the nail is driven to within ⅛ of an inch of the waterproofing material and not flush with the waterproofing material. The test specimen is preconditioned for 24 hours at 23° C. instead of 4 hours at 2° C. followed by 20 hours at 23° C. Also, the 5 inch water load is replaced with a 1.5 inch water load for the 1.5 inch detail (although it is preferable to do testing using both 1.5 inches and 5.0 inches of water). Other than these minor modifications, all procedures are the same as for ASTM D 7349-11.

Example 1

Nail sealability testing under ASTM D 7349-11/D7349M-11 (protocol 1) was modified to employ a 1.5 inches water level, as well as 5.0 inches water level, and to drive a nail fastener so that it was close to but not quite flush with the polymer barrier coating on a board. Thus, the relevant conditions from this standard test procedure are reproduced below:

| | |
|---|---|
| Substrate | APA Rated Sheathing, 32/16, Exposure 1 plywood, 12 mm [15/32 inches] thick |
| Intervening Material | None |
| Fastener | ASTM F1667 NLRFSS-53Z [smooth shank steel roofing nail, 32 mm (1.25 in.) long with a shank diameter of 3.05 mm [0.120 in.], a head diameter of 9.52 mm [0.375 in.], and a zinc coating |
| Fastener Driving Method | With a hammer, perpendicular to the specimen, until the fastener head is ⅛" from the surface of the specimen |

| | |
|---|---|
| Assembly Conditioning | 24 hours at 23° C. |
| Water Depth | Tested at 1.5 inches; also tested at 5.0 inches |
| Test Temperature | 2° C. |
| Test Period | 72 hours |
| Intervening Material | None |

Example 2

To evaluate blocking resistance, one coated panel (board) was laid on top of another in a manner that the coated surface of one sample was in contact with uncoated surface of another. A pressure of 60 lbs/square inch was applied in a hydraulic press, simulating simulates a stack of numerous boards during storage. The samples were under static load for 24 hours at room temperatures and in some cases heated up to 120° F. It was confirmed that the stacked boards will not block (i.e., can be separated without sticking of the coating that ruptures the integrity of the coating layer) when the test is conducted at room temperature. Preferably, the samples will not block when the test is conducted at 90° F. More preferably, the samples will not block when the test is conducted at 120° F.

Example 3

In further exemplary embodiments, the polymeric barrier coating according to any of the foregoing first through eighteenth aspects described above, have a tensile set after 50% elongation of no more than (</=) 25%, more preferably </=15%, and most preferably </=10%, in accordance with ASTM D412(1998). Determination of tensile set property is described in Section 12.2 of ASTM D412(1998), whereby a dumbbell shaped specimen of the (hardened) polymer is placed into the grips of the testing machine (e.g., Instron™ brand) so as to distribute tension uniformly over the cross section of the sample. The grips should pull on the sample at a uniform rate of speed, typically about 15 seconds to reach specified elongation (e.g., 50%). The specimen is held for ten minutes; then it should be released quickly (without allowing snap back); and then the sample should be allowed to rest for ten minutes, after which the percentage of "non-recovery" is measured. Tensile set value is measured by multiplying 100 times the difference between post-stretch length minus the pre-stretch length, divided by the pre-stretch length.

Accordingly, further exemplary panel-based sheathing system for sheathing a wall or roof structure at a building site, may comprise the same features as described for the first through eighteenth exemplary aspects described above, except that the self-sealing property is not described by reference to ASTM D7349/D7349M-11, but rather by having a tensile set value of 25%, more preferably 15%, and most preferably 10%, as determined under ASTM D412-98.

The invention must not be interpreted as limited to the particular embodiments disclosed herein, since these are to be regarded as illustrative rather than restrictive. Skilled artisans can make variations and changes based on the exemplary embodiments described herein without departing from the spirit of the invention.

It is claimed:

1. A panel-based sheathing system for sheathing a wall or roof structure at a building site, the sheathing system comprising:

at least two adjacent coated panels comprising a material chosen from wood, plywood, oriented strand board, or a combination thereof, and having an outer surface and an inner surface connected by four transverse edges, and at least one transverse edge extending between the at least two adjacent coated panels, whereby at least the outer surface of the at least two adjacent coated panels contains a polymeric barrier coating comprising at least one polymer or copolymer chosen from a polyurea, an ABA block copolymer comprising polymethylmethacrylate/polybutyl acrylate/polymethyl-methacrylate, a blend of hot melt polyamide with the ABA block copolymer, a UV cured acrylic, and said polymeric barrier coating further comprising a filler in the amount of 0% to 10% based on total weight of the coating, the adjacent coated panels being aligned at the building site with at least one transverse edge proximate to the at least one transverse edge of the adjacent coated panel and defining a joint between these at least two adjacent coated panels;

fasteners chosen from nails, staples, screws, or mixture thereof, and penetrated through the panel coatings to fasten the coated panels into place to form sheathing for the wall or roof structure;

the at least two adjacent coated panels being pre-coated with said polymeric barrier coating prior to being aligned and fastened at the building site, using a panel coating production line located at a site that is separate from the building site at which the adjacent coated panels are aligned, the polymeric barrier coating having a thickness of from 1 to 20 mils and having the following properties:

(A) the polymeric coating barrier having an average thickness in the range of 1 to 20 mils which is applied to the panel at 100% solids so as to avoid drying-off of water or solvent and to enable coated panels to be stacked immediately after coating for storage;

(B) the polymeric coating barrier having water vapor permeability of at least 5 perms, as measured in accordance with ASTM E 96, Method B (2016); and (C) the polymeric coating barrier being self-sealing around the metal fasteners penetrated through the coated panels to prevent passage of liquid water at the coating/fastener interface in accordance with ASTM D7349/D7349M-11, Protocol 1, modified by driving fastener head to within ⅛ inch short of being flush with coating sample, conditioning the test specimen for 24 hours at 23° C., and using 1.5 to 5.0 inches water depth in hydrostatic head testing.

2. The panel sheathing system of claim 1 wherein the panel system forms a sealed wall or roof of the structure without applying a further air barrier chosen from paper, house wrap, or liquid coating over or against the coated panels.

3. The panel sheathing system of claim 1 wherein the at least one polymer or copolymer is a polyurea that is a reaction product of an isocyanate terminated prepolymer and a multifunctional amine.

4. The panel sheathing system of claim 1 wherein the at least one polymer or copolymer is an ABA acrylic block copolymer comprising polymethylmethacrylate, polybutyl acrylate, and polymethyl methacrylate.

5. The panel sheathing system of claim 1 wherein the at least one polymer or copolymer comprises a blend of ABA acrylic block copolymer and a hot melt coating that is the reaction product of the difunctional carboxylic acid and a difunctional amine.

6. The panel sheathing system of claim 1 wherein the at least one polymer or copolymer is a coating produced by ultraviolet cure of a mixture of components chosen from acrylated monomers, acrylated oligomers, or mixture thereof.

7. The panel sheathing system of claim 1 wherein the joint defined between the at least two coated panels is seamed using a tape, a liquid-applied coating, or combination thereof.

8. The panel sheathing system of claim 1 wherein the inner surfaces, transverse edges, or both the inner surfaces and transverse edges, are coated with the polymeric barrier coating.

9. A method for making a panel-sheathing system comprising:
providing at least two adjacent coated panels comprising a material chosen from wood, plywood, oriented strand board, or a combination thereof, and having an outer surface and an inner surface connected by four transverse edges, and at least one transverse edge extending between the at least two adjacent coated panels, whereby at least the outer surface of the at least two adjacent coated panels contains a polymeric barrier coating, the polymeric barrier coating comprising at least one polymer or copolymer chosen from a polyurea, an ABA block copolymer comprising polymethylmethacrylate/polybutyl acrylate/polymethyl-methacrylate, a blend of hot melt polyamide with the ABA block copolymer, a UV cured acrylic, or mixture thereof; and
said polymeric barrier coating further comprising a filler in the amount of 0% to 10% based on total weight of the coating;
aligning the adjacent coated panels at a building site with at least one transverse edge of one coated panel proximate to the at least one transverse edge of an adjacent coated panel thereby to define a joint between the adjacent coated panels, the at least two adjacent coated panels being pre-coated prior to being aligned at the building site using a panel coating production line located at a site that is separate from the building site at which the adjacent coated panels are aligned;
fastening the two aligned coated panels in adjacent position using fasteners chosen from nails, staples, screws, or mixture thereof, and penetrating the fasteners through the panel coatings to fasten the coated panels into place to form sheathing for the wall or roof structure; and
the polymeric barrier coating having the following properties:
(A) polymeric coating barrier having an average thickness in the range of 1 to 20 mils which is applied to the panel at 100% solids so as to avoid drying-off of water or solvent and to enable coated panels to be stacked immediately after coating for storage;
(B) the polymeric coating barrier having water vapor permeability of at least 5 perms as measured in accordance with ASTM E 96-16, Method B;
(C) the polymeric coating barrier being self-sealing around the metal fasteners penetrated through the coated panels to prevent passage of liquid water at the coating/fastener interface in accordance with ASTM D7349/D7349M-11, Protocol 1, modified by driving fastener head to within ⅛ inch short of being flush with coating sample, conditioning the test specimen for 24 hours at 23° C., and using 1.5 to 5.0 inches water depth in hydrostatic head testing.

10. A panel-based sheathing system for sheathing a wall or roof structure at a building site, the sheathing system comprising:
at least two adjacent coated panels comprising a material chosen from wood, plywood, oriented strand board, or a combination thereof, and having an outer surface and an inner surface connected by four transverse edges, and at least one transverse edge extending between the at least two adjacent coated panels, whereby at least the outer surface of the at least two adjacent coated panels contains a polymeric barrier coating comprising an ABA acrylic block copolymer and a hot melt coating that is the reaction product of a difunctional carboxylic acid and a difunctional amine, the adjacent coated panels being aligned at the building site with at least one transverse edge proximate to the at least one transverse edge of the adjacent coated panel and defining a joint between these at least two adjacent coated panels;
fasteners chosen from nails, staples, screws, or mixture thereof, and penetrated through the panel coatings to fasten the coated panels into place to form sheathing for the wall or roof structure;
the at least two adjacent coated panels being pre-coated with said polymeric barrier coating prior to being aligned and fastened at the building site, using a panel coating production line located at a site that is separate from the building site at which the adjacent coated panels are aligned;
the at least two adjacent coated and fastened panels being seamed using a tape, a liquid-applied coating, or combination thereof; and
the polymeric barrier coating having a thickness of from 1 to 20 mils and having the following properties:
(A) polymeric coating barrier having an average thickness in the range of 1 to 20 mils which is applied to the panel at 100% solids so as to avoid drying-off of water or solvent and to enable coated panels to be stacked immediately after coating for storage;
(B) the polymeric coating barrier having water vapor permeability of at least 5 perms, as measured in accordance with ASTM E 96, Method B (2016); and
(C) the polymeric coating barrier being self-sealing around the metal fasteners penetrated through the coated panels to prevent passage of liquid water at the coating/fastener interface in accordance with ASTM D7349/D7349M-11, Protocol 1, modified by driving fastener head to within ⅛ inch short of being flush with coating sample, conditioning the test specimen for 24 hours at 23° C., and using 1.5 to 5.0 inches water depth in hydrostatic head testing,
wherein the at least two adjacent coated and fastened panels form a portion of a sealed wall or roof of the structure without a further air barrier chosen from paper, house wrap, or liquid coating over or against the at least two adjacent coated and fastened panels.

11. The panel sheathing system of claim 1 wherein the thickness of the polymeric barrier coating is from 3 to 15 mils.

12. The panel sheathing system of claim 11 wherein the thickness of the polymeric barrier coating is from 5 to 10 mils.

13. The panel-based sheathing system of claim 10 wherein the thickness of the polymeric barrier coating is from 3 to 15 mils.

14. The panel-based sheathing system of claim 13 wherein the thickness of the polymeric barrier coating is from 5 to 10 mils.

15. The panel sheathing system of claim 1 wherein the polymeric coating barrier has a blocking resistance, wherein, if the at least two of the boards were stacked on top of each other such that at least one coated outer surface were sandwiched between the two panels, such stacked panels would not become blocked when subjected to a pressure of 60 pounds per square inch, under static load for 24 hours at temperature within the range of 60° F. to 72° F.

16. The panel-based sheathing system of claim 10 wherein the polymeric coating barrier has a blocking resistance, wherein, if the at least two of the boards were stacked on top of each other such that at least one coated outer surface were sandwiched between the two panels, such stacked panels would not become blocked when subjected to a pressure of 60 pounds per square inch, under static load for 24 hours at temperature within the range of 60° F. to 72° F.

17. The method of claim 9 wherein, if the at least two of the boards were stacked on top of each other such that at least one coated outer surface were sandwiched between the two panels, such stacked panels would not become blocked when subjected to a pressure of 60 pounds per square inch, under static load for 24 hours at temperature within the range of 60° F. to 72° F.

* * * * *